United States Patent
Blumenstock et al.

[11] Patent Number: 6,006,596
[45] Date of Patent: Dec. 28, 1999

[54] METHOD OF DETERMINING BAD TRAVEL DISTANCES DURING TRAVELLING OF MOTOR VEHICLE

[75] Inventors: Andreas Blumenstock, Ludwigsburg; Martin Mast, Gerlingen, both of Germany

[73] Assignee: Robert Bosch GmbH, Stuttgart, Germany

[21] Appl. No.: 08/214,363

[22] Filed: Mar. 16, 1994

[30] Foreign Application Priority Data

Apr. 14, 1993 [DE] Germany .............................. 43 11 925

[51] Int. Cl.[6] ...................................... G01L 3/26
[52] U.S. Cl. ............................................ 73/113; 73/178 R
[58] Field of Search ................... 73/178 R, 113, 73/115, 716, 736

[56] References Cited

U.S. PATENT DOCUMENTS 2,652,719  9/1953  Bracci ........................................ 73/113
3,835,700  9/1974  Gamble ...................................... 73/113
4,217,644  8/1980  Kato et al. .................................. 73/113
4,552,015  11/1985  Emmett et al. ............................ 73/113

FOREIGN PATENT DOCUMENTS 4227893  4/1993  Germany .

Primary Examiner—Richard Chilcot
Assistant Examiner—Elizabeth L. Dougherty
Attorney, Agent, or Firm—Michael J. Striker

[57] ABSTRACT

A method of determining bad travel distances during traveling of a motor vehicle having a fuel tank, includes the steps of providing a differential pressure sensor at the fuel tank, determining by the differential pressure sensor a filling level of the fuel tank and producing a filling level pressure signal, determining by the differential pressure sensor a gas pressure inside the fuel tank and producing a gas pressure signal, and determining a bad travel distance by evaluating fluctuations in at least one of the pressure signals.

5 Claims, 1 Drawing Sheet

METHOD OF DETERMINING BAD TRAVEL DISTANCES DURING TRAVELLING OF MOTOR VEHICLE

BACKGROUND OF THE INVENTION

The present invention relates to a method of determining bad travel distances during travelling of a motor vehicle.

Methods of operating the differential pressure sensor for determining a filling level of a fuel tank and for determining a gas pressure inside the fuel tank. are known in the art. One of such methods and a respective differential pressure sensor are disclosed for example in the non-published German patent document DE-OS 42 27 893. The above mentioned differential sensor is suitable for determination of the pressure of the fuel column through the measuring point and thereby, with the known dimensions of the fuel tank and suitable arrangement, for determination of the filling level. Simultaneously due to the determination of the gas pressure above the fuel level, a diagnosis of the tank ventilating device can be provided.

It is further known to determine the running unquiteness moment of the motor for combustion failure (misfire) determination in the internal combustion engines of motor vehicles. During traveling over rough travel distances it is however not possible to differentiate whether this running unquiteness is caused by combustion failure or by roadway unevenness. Therefore, for determination and limiting of vibrations an acceleration sensor is needed to enable a combustion failure determination.

SUMMARY OF THE INVENTION

Accordingly, it is an object of the present invention to provide a method of determining bad travel distances during travelling of a motor vehicle.

In keeping with these objects and with others which will become apparent hereinafter, one feature of the present invention resides, briefly stated, in a method of determining bad travel distances during travelling of a motor vehicle including determination of a filling level of the fuel tank and determination of a gas pressure in the fuel tank, wherein in accordance with the present invention fluctuations of a filling level pressure signal are evaluated for determination of bad travel distances (roadway properties).

In accordance with another feature of the present invention, the fluctuations of a gas pressure signal can be used for evaluation of bad travel distances.

When the method is performed in accordance with the present invention, it is possible with the utilization of a single pressure differential sensor to determine the filling level of the fuel tank of the motor vehicle, to determine the gas pressure and thereby to provide a diagnosis of the tank ventilating device, and simultaneously to determine a bad travel distance. The differential pressure sensor used for the inventive method does not have mechanical movable parts and is simple to mount. Moreover, for the bad travel distance determination no expensive orientation of the sensor and no difficult searches for a proper mounting point for the acceleration sensor are needed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
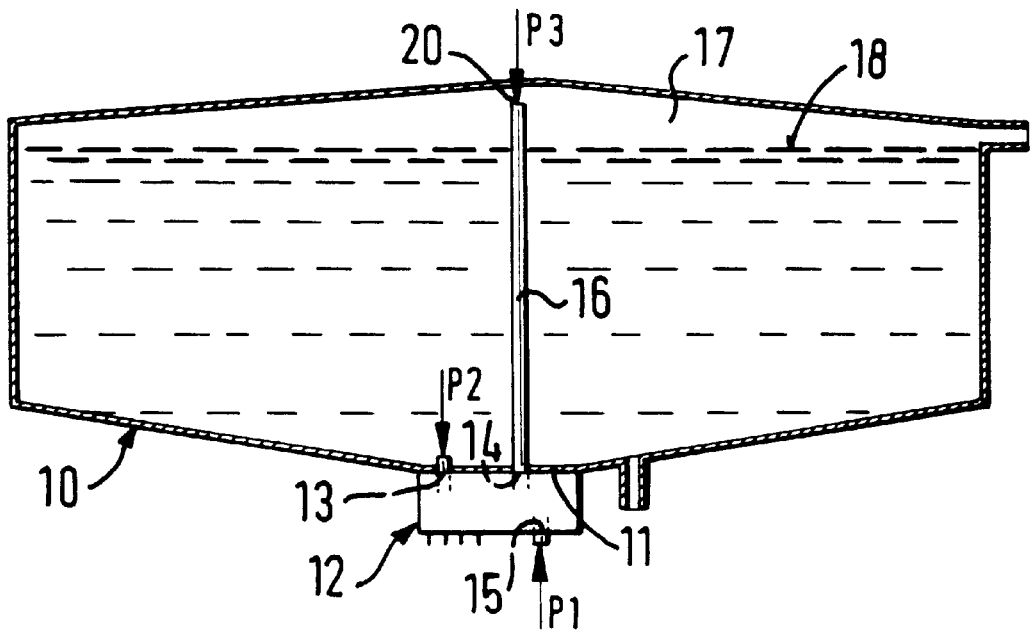
FIG. 1 is a view schematically showing a fuel tank of a motor vehicle with a differential pressure sensor.
Figure 2:
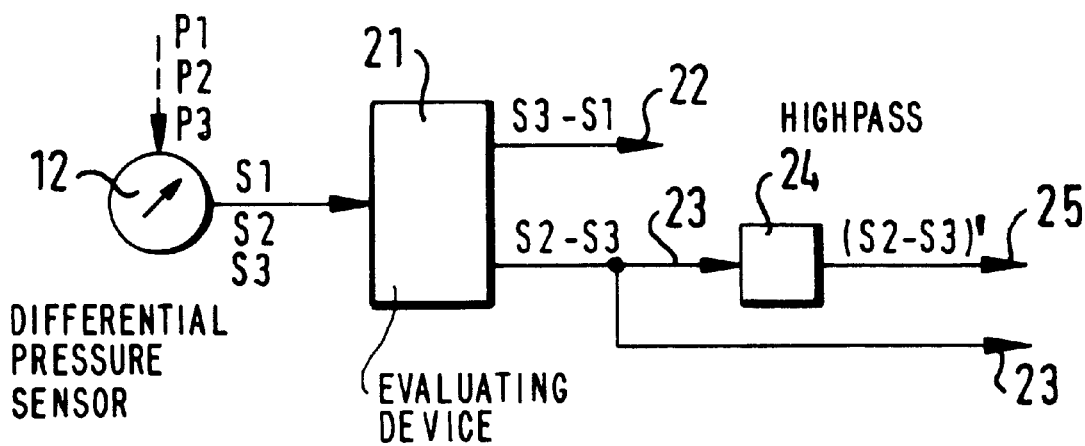
FIG. 2 is a view schematically showing a block diagram for a method in accordance with the present invention.

A fuel tank of a motor vehicle provided with an internal combustion engine is identified as a whole with reference numeral 10 in FIG. 1. The fuel tank is more or less filled with fuel. A differential pressure sensor 12 is arranged at a lower side 11 of the fuel tank or at a lower side of the fuel tank 10 in mounted condition.

The differential pressure sensor 12 has three pressure inputs 13, 14, 15. The third pressure input 15 is connected with a surrounding area outside of the fuel tank. The differential pressure sensor is supplied with the atmospheric pressure p1 through the pressure inlet 15. The second pressure inlet 14 is connected through a pressure pipe 16 with a gas pressure chamber 17 of the fuel tank. The gas pressure chamber 17 is located above a liquid level 18 of the fuel accommodated in the fuel tank 10. The pressure of the fuel-air mixture acting in the gas pressure chamber 17 is supplied through the pressure pipe 16 to the second pressure input 14 of the differential pressure sensor 12. The pressure pipe 16 is formed so that its opening 20 located in the gas pressure chamber 17 in each operational situation of the motor vehicle is located above the liquid level 18. The first pressure input 13 is located in the lower region of the fuel tank 10. The pressure p2 of the fuel column is supplied to the differential pressure sensor 12 through the first pressure input 13.

The differential pressure sensor 12 is connected with an evaluating device 21. Output signals 22 and 23 of the evaluating device represent a value for the pressure acting in the gas pressure chamber 17 in comparison with the atmospheric pressure and the filling level of the fuel tank. The first output signal 22 is produced from a difference of the pressures p3 and p1 or their signals S3 and S1 produced in the differential pressure sensor 12. With this pressure differential between the pressure in the gas pressure chamber 17 and the pressure p1 of the atmosphere, an underpressure or an overpressure in the fuel tank relative to the environment can be determined. Thereby it is possible to obtain a diagnosis of the tank ventilating device of the fuel tank.

The second output signal 23 is produced from a difference of the pressures p2 and p3 or the associated signals S2 and S3. With this output signal 23, in condition of known geometry of the fuel tank, the fuel level can be determined. This output signal is independent from the altitude and from the underpressure or overpressure acting in the fuel tank due to the gas pressure. From the differential value of the pressures p2 and p3, the height of the liquid column over the first pressure input can be determined independently from the pressure in the gas pressure chamber 17.

It is also possible to determine separately the pressure p2 or the pressure p3. However, in this case the above described independence and comparison possibilities are dispensed with.

During traveling of the motor vehicle due to travel unevenness, a more or less strong movement of the liquid level 11 in the fuel tank can occur. Thereby, both the pressure p2 of the liquid column over the first pressure input 13, and also the pressure p3 of the gas chamber in the region of the opening 20 fluctuate. By evaluation of one or both associated pressure signals S2 or S3 or the differential signal (output signals 22 and 23), the above described fluctuations of the liquid level can be determined. The corresponding output signal has in this case strong time changes which are recognizable as high frequency portion of the signal. When the output signal 23 (or analog of the output signal 22) is supplied for evaluation to a high pass 24, its output signal 25 (S2–S3)' produces a pressure signal corresponding to the above mentioned high frequency portion. By evaluating of the output signal 25 of the high pass 24 conclusions can be made with respect to the road condition (bad travel distance) which is required for initially mentioned combustion failure recognition.

By evaluating the time course of one or both of the pressure signals produced by the differential pressure sensor, a third value for the operation of a motor vehicle can be determined in simple and advantageous manner.

It will be understood that each of the elements described above, or two or more together, may also find a useful application in other types of constructions differing from the types described above.

While the invention has been illustrated and described as embodied in a method for operating differential pressure sensor in a fuel tank of motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method of determining bad travel distances resulting from roadway unevenness during traveling of a motor vehicle having a fuel tank, comprising the steps of providing a differential pressure sensor at the fuel tank; determining by the differential pressure sensor a filling level of the fuel tank and producing a fuel tank filling level pressure signal; determining by the differential pressure sensor a gas pressure inside the fuel tank and producing a fuel tank gas pressure signal; and determining a bad travel distance by evaluating fluctuations in at least one of said pressure signals.

2. A method as defined in claim 1, wherein said determining a bad travel distance includes evaluation of fluctuations of the filling level pressure signal.

3. A method as defined in claim 1, wherein said determining a bad travel distance includes evaluation of fluctuations of the fuel tank gas pressure signal.

4. A method as defined in claim 2; and further comprising supplying the fuel tank filling level pressure signal to a high pass to produce a high pass output signal.

5. A method as defined in claim 3; and further comprising supplying the fuel tank gas pressure signal to a high pass to produce a high pass output signal.

* * * * *